Aug. 18, 1959     H. WILLIAMS ET AL     2,900,486
MEANS FOR GUIDING A WORK HEAD OVER A WORK PIECE
Filed June 5, 1958     3 Sheets-Sheet 1

INVENTORS
H. WILLIAMS +
W. C. HOLLIDAY
By Holcombe, Wetherill & Brisebois
ATTORNEYS Aug. 18, 1959     H. WILLIAMS ET AL     2,900,486
MEANS FOR GUIDING A WORK HEAD OVER A WORK PIECE
Filed June 5, 1958     3 Sheets-Sheet 2

INVENTORS
H. WILLIAMS &
W. C. HOLIDAY
By Holcomb, Wetherill & Brisebois
ATTORNEYS

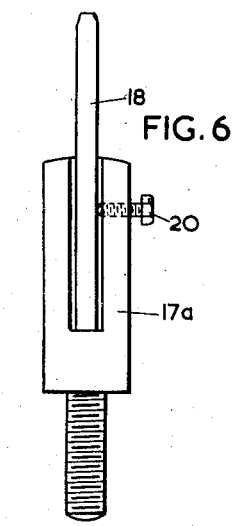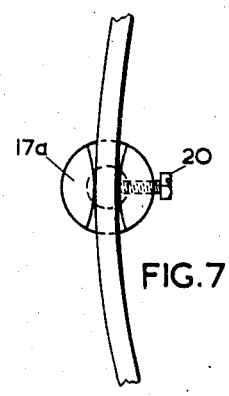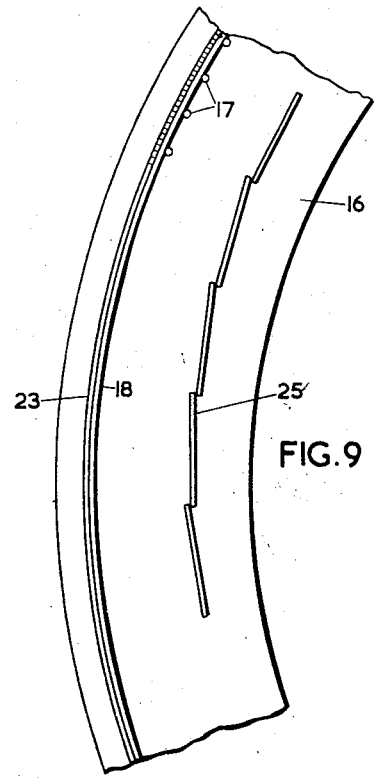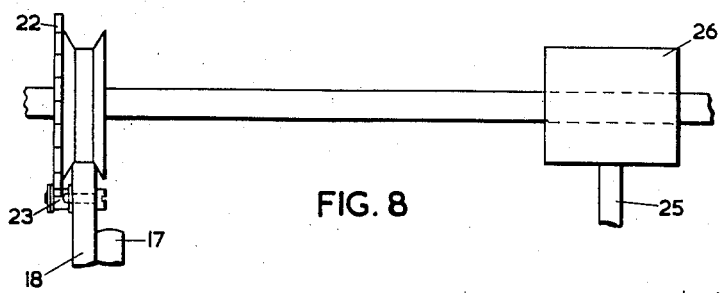

United States Patent Office 2,900,486
Patented Aug. 18, 1959

2,900,486

MEANS FOR GUIDING A WORK HEAD OVER A WORK PIECE

Harry Williams and William Clarke Holliday, Darlington, England, assignors to Whessoe Limited, Darlington, England, a British company Application June 5, 1958, Serial No. 740,066

9 Claims. (Cl. 219—125)

This invention relates to means for guiding a work head over a work piece. The invention is particularly applicable to the guiding of automatic welding apparatus along the seams of a large vessel in the course of fabricating the vessel, and the invention will be described below by reference to such use. It will be understood, however, that the invention may be applied to the guiding of work heads of other kind (for example, cutting or burning apparatus) and in other situations and circumstances.

Large spherical vessels may be fabricated from plates butt welded together along vertical seams, lying on great circles of the sphere, and along horizontal seams, lying in planes parallel to the equator of the sphere. In applying the invention to the welding of a horizontal seam of such a vessel, a horizontally extending circular, or part circular, track is temporarily secured to the wall of the vessel, adjacent and parallel to the line of the seam. This track is so constructed that the carriage of automatic welding apparatus of the selected type can be supported on and driven along it. While the track may be constructed as a permanent rigid structure, it is then necessary to provide a different track for every differently shaped or dimensioned seam. We therefore prefer to use a track comprising flexible rails detachably secured to support members, so that the rails can be reshaped and used together with support members to constitute guiding means of a different shape or size. The track and welding apparatus are preferably so disposed that the welding is done as far as possible in the downhand position.

A number of embodiments of the invention are shown by way of example in the accompanying drawings, in which:

Figures 6 and 7 are respectively an elevation and plan of a modified detail; and Figures 8 and 9 are views, corresponding respectively to the upper part of Figure 4 and to Figure 3, of another modification.

Figure 1:
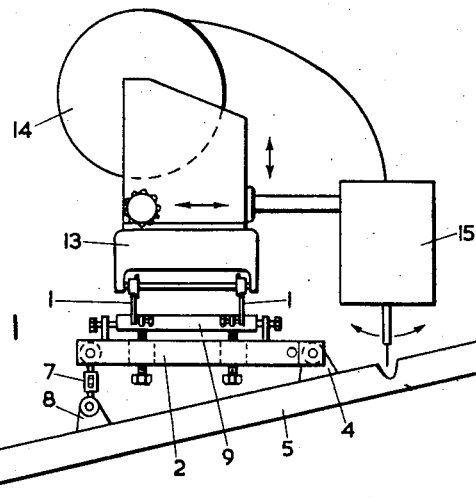
Figure 1 is an elevation of automatic welding apparatus supported on a track which is in turn supported by a nearly horizontal part of a vessel wall.
Figure 2:
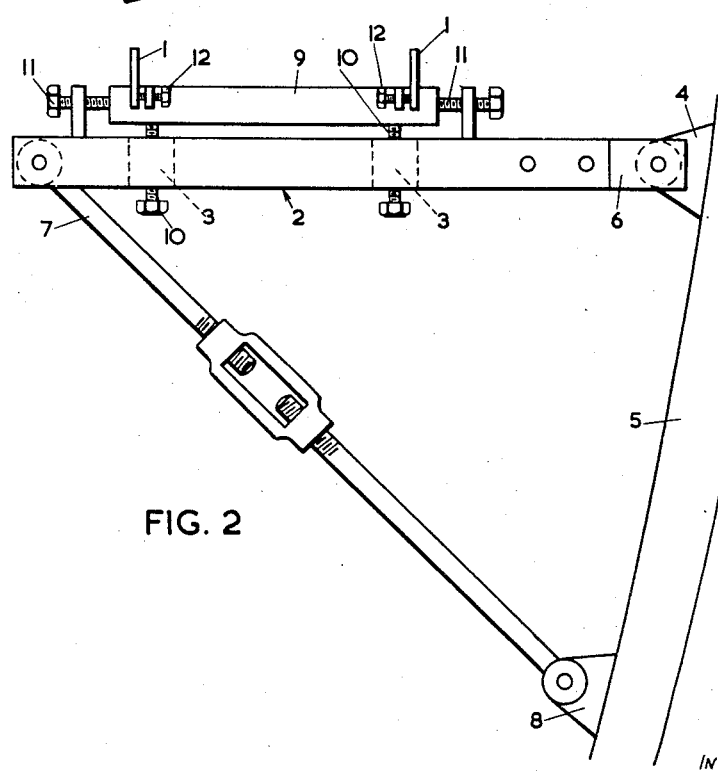
Figure 2 is a similar view on a larger scale of the track and support means alone secured to a nearly vertical part of a vessel wall.

Referring first to Figures 1 and 2, the track comprises two rails, formed by steel flats 1, set vertically and rolled to the required radius. These rails are removeably clamped in a plurality of separate members (described below in detail) which support and position the rails and are distributed along their length. The rails can be re-rolled to a different radius when required, and the support members can be used for tracks of any radius. Each of the track supports (only one of which is shown) comprises a horizontal member 2 composed of two flats set vertically and secured in spaced parallel relation by a pair of interposed blocks 3. One end of this horizontal member is attached to a lug 4 welded to the shell 5 of the vessel by a pivot which allows movement in a vertical radial plane. As shown in Figure 2, the effective length of the horizontal member may be varied by means of an extension piece 6 which makes the pivotal connection to the lug and is bolted at one of a number of alternative positions between the spaced flats. The other end of the horizontal support member is pivotally attached to one end of a rod 7, whose other end is pivotally attached to a second lug 8 on the shell. The length of the rod 7 can be adjusted by the turn-buckle device shown in Figure 2, or by other suitable means to bring the track assembly into the horizontal position. It will be appreciated that by the use of extension pieces and rods, such as 6 and 7, of appropriate lengths the support members 2 can be supported horizontally at a suitable distance from shell plates 5 inclined at any angle, so that the same members can be used successively for welding all the courses of plates in a spherical vessel.

The horizontal member 2 supports a track bearer member in the form of a horizontal bar 9, which is adjustably located vertically by bolts 10 threaded through the blocks 3 of the support member and is adjustably located in a horizontal radial direction by a second pair of bolts 11 threaded through lugs upstanding from the support member. The upper surface of the bearer member 9 is slotted to receive the rails 1, which are clamped in position by bolts 12 threaded through lugs projecting from the member 9. The two rails are thus located in the same horizontal plane, parallel to one another and to the seam to be welded.

The rails 1 serve to support and guide automatic welding apparatus of any suitable construction. Figure 1 shows somewhat diagrammatically an apparatus of known construction comprising a tractor or carriage 13, provided with pairs of wheels which run on the rails 1 and have flanges which engage on opposite sides of the two rails. The tractor carries amongst other gear a welding wire supply reel 14 and a welding head 15, the latter being mounted for vertical, lateral and angular adjustment, as indicated by the arrows.

Figure 3:
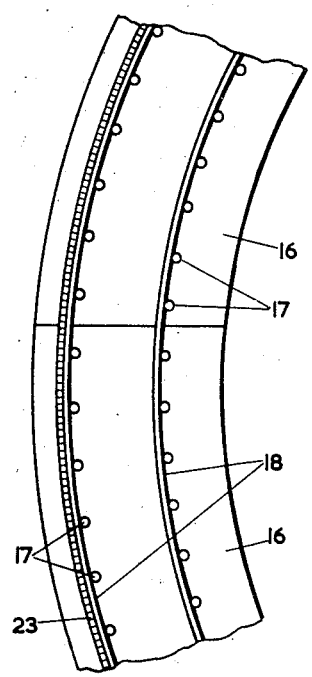
Figure 3 is a plan view of part of an alternative form of track and support means.
Figure 5:
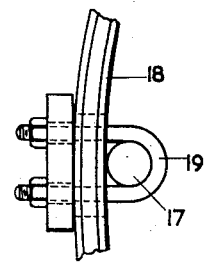
Figure 5 is a plan view of a detail.
Figure 4:
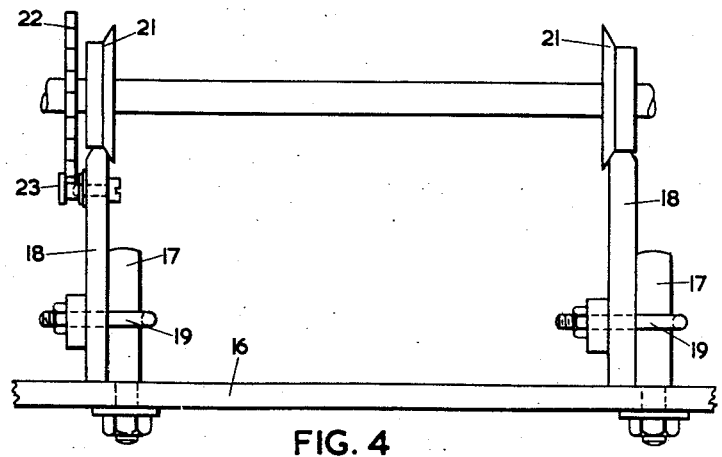
Figure 4 is an elevation of these means showing also part of a carriage supported on the track.

In the alternative constructions shown in Figures 3 to 9, the separate bearer bars 9 for supporting and locating the rails are replaced by bearer plates 16 which are continuous along the length of the rails and are supported at intervals along their length by support members (not shown in Figures 3 to 9) which may be similar to those shown in Figures 1 and 2. In the construction of Figures 3 to 5 the plates 16 are drilled with holes set in two spaced arcuate rows of the required radius, each hole receiving the reduced lower end of a vertical peg 17 which is secured by a nut. Spring steel rails 18 are tensioned around the rows of pegs and secured by U bolts 19 to at least some of the pegs, for example to every fifth or sixth peg. Alternatively, as shown in Figures 6 and 7, the pegs 17a may be vertically slotted to receive the rails (the slots having curved sides to allow the rail 18 to be bent to any radius while having only one point of contact with each peg), clamping screws 20 being provided on some or all of the pegs. As in the first described form of the invention, the carriage carrying the welding gear or other work head runs on four single flanged wheels 21, whose axles may be arranged to swivel to permit them to run on rails of different radii. The carriage may be driven by a sprocket wheel 22 on the carriage engaging a chain 23 which is secured to one of the rails 18 to form a rack. With this form of the invention all the parts of the track assembly, except the bearer plates 16 can be used for seams of different radii, while the chain and sprocket wheel arrangement gives a positive drive for the carriage.

In the modified construction shown in Figures 8 and 9 only one of the two rails is held by pegs as described above, this rail 18 acting as the guide rail and being engaged by double flanged wheels 24 on the carriage. The second rail 25 then acts purely as a support and may consist of a curved or polygonal flat, or (as shown) of a series of abutting or overlapping flats, tack welded to the bearer plate, the wheel or wheels 26 on the carriage which run on this second rail being unflanged and axially elongated.

Many other modifications of the constructions described and illustrated may be made within the scope of the appended claims.

We claim:

1. Means for guiding a work head along a predetermined path relative to a work piece, comprising a track spaced from the surface of the work piece and extending parallel to the said path, and a plurality of supports for the track secured to the work piece and distributed at intervals along the length of the track, whereby to support the track from the work piece, the track serving to support and guide the work head, said track comprising a plurality of flexible rails detachably secured to the support members, so that the rail can be reshaped and used together with the support members to constitute guiding means of different size and shape.

2. Means for forming a curved welded seam lying substantially in a horizontal plane between plates disposed on opposite sides of the line of the required seam, comprising a plurality of support members secured to the plate or plates on one side of the said line and spaced apart along its length, a substantially horizontal track carried on said support members and extending parallel to and spaced from the line of the required seam, and automatic welding apparatus supported on and guided by the track for movement therealong.

3. Means in accordance with claim 1 in which a pair of rails constituting the track are supported and located relative to one another by a plurality of separate bearer members spaced apart along the length of the rails and each forming part of one of said support members.

4. Means in accordance with claim 3 in which each of the bearer members is mounted for adjustment vertically and horizontally transversely to the line of the rails relative to the remainder of the support member of which it forms part.

5. Means in accordance with claim 1, in which a pair of rails constituting the track are supported and located relative to one another by bearer plates which are continuous along the length of the rails and are supported at intervals along their length by the said support members.

6. Means in accordance with claim 5, in which a rail is located along the required line by a row of pegs projecting from the bearer plates, the rail being held against the pegs and secured to at least some of them.

7. Means in accordance with claim 6, in which the pegs are slotted to receive the rail.

8. Means in accordance with claim 1 in which the track comprises a pair of rails each accurately parallel to the required path of movement of the welding apparatus or other work head, the work head being supported on a carriage provided with wheels which run on the rails and have flanges which engage on opposite sides of the two rails.

9. Means in accordance with claim 1 in which the track comprises one rail accurately parallel to the required path of movement of the welding apparatus or other work head and a second rail extending approximately parallel to the first rail, the work head being supported on a carriage provided with wheels which run on the rails, at least one wheel which runs on the first rail having flanges which engage on both sides of that rail while the wheel or wheels which run on the second rail are unflanged and axially elongated.

References Cited in the file of this patent

UNITED STATES PATENTS 2,305,163  House _____ Dec. 15, 1942